(12) United States Patent
Kollep et al.

(10) Patent No.: US 8,844,428 B2
(45) Date of Patent: Sep. 30, 2014

(54) EXTRACTION SYSTEM FOR THE PREPARATION OF A BEVERAGE FROM A CARTRIDGE

(75) Inventors: Alexandre Kollep, Lutry (CH); Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 943 days.

(21) Appl. No.: 12/442,906

(22) PCT Filed: Sep. 20, 2007

(86) PCT No.: PCT/EP2007/059930
§ 371 (c)(1), (2), (4) Date: Oct. 28, 2009

(87) PCT Pub. No.: WO2008/037642
PCT Pub. Date: Apr. 3, 2008

(65) Prior Publication Data
US 2010/0107888 A1  May 6, 2010

(30) Foreign Application Priority Data
Sep. 26, 2006  (EP) .................................... 06121239

(51) Int. Cl.
*A47J 31/40* (2006.01)
*A47J 31/06* (2006.01)
*A47J 31/36* (2006.01)

(52) U.S. Cl.
CPC .............. *A47J 31/06* (2013.01); *A47J 31/3633* (2013.01)
USPC .......................................... 99/295; 99/302 R

(58) Field of Classification Search
USPC ..................... 99/295, 302 R, 302 P
See application file for complete search history.

(56) References Cited

U.S. PATENT DOCUMENTS

| | | | | |
|---|---|---|---|---|
| 4,846,052 A | * | 7/1989 | Favre et al. .................... | 99/295 |
| 5,634,394 A | * | 6/1997 | Cortese ......................... | 99/295 |
| 6,499,388 B2 | * | 12/2002 | Schmed ......................... | 99/295 |
| 6,763,759 B2 | | 7/2004 | Denisart ..................... | 99/302 P |
| 6,854,378 B2 | * | 2/2005 | Jarisch et al. ................... | 99/295 |

(Continued)

FOREIGN PATENT DOCUMENTS

| EP | 512 470 A1 | 11/1992 |
|---|---|---|
| EP | 1 090 574 A1 | 4/2001 |

(Continued)

OTHER PUBLICATIONS

International Search Report PCT/EP2007/059930 Dated May 13, 2008.

(Continued)

*Primary Examiner* — Reginald L Alexander
(74) *Attorney, Agent, or Firm* — Winston & Strawn LLP

(57) ABSTRACT

Extraction system for preparing a beverage from a cartridge using a fluid injected under pressure into the cartridge. The system includes a cartridge and an extraction device intended to accept the cartridge. The extraction device includes an injection cage and a cartridge support being arranged in such a way as to be moved relative to one another in the pre-injection mode of closure around the cartridge by a closure device. The injection cage has a base and a closure piston unit which is mounted such that it can be moved axially with respect to the base. The closure piston unit can be moved relative to the base by the pressure exerted by the fluid upon injection.

20 Claims, 11 Drawing Sheets

(56) References Cited

U.S. PATENT DOCUMENTS

| | | |
|---|---|---|
| 2002/0023543 A1 | 2/2002 | Schmed ............... 99/295 |
| 2003/0217643 A1 | 11/2003 | Masek et al. ............... 99/279 |
| 2004/0079237 A1 | 4/2004 | Denisart ............... 99/275 |
| 2009/0017177 A1* | 1/2009 | Yoakim et al. ............... 426/431 |
| 2009/0126577 A1* | 5/2009 | Ternite ............... 99/295 |
| 2009/0280219 A1* | 11/2009 | Yoakim et al. ............... 426/77 |
| 2010/0107888 A1 | 5/2010 | Kollep et al. ............... 99/295 |
| 2010/0173053 A1 | 7/2010 | Ryser et al. ............... 426/431 |

FOREIGN PATENT DOCUMENTS

| | | |
|---|---|---|
| EP | 1 495 702 A1 | 1/2005 |
| EP | 1 552 777 A1 | 7/2005 |
| EP | 1 567 036 B1 | 8/2005 |
| EP | 1 646 305 B1 | 4/2006 |
| EP | 1 654 966 A1 | 5/2006 |
| FR | 2 617 389 | 1/1989 |
| JP | 2004534562 A | 11/2004 |
| WO | WO02/058523 A1 | 8/2002 |
| WO | WO 2005/115206 A1 | 12/2005 |
| WO | WO 2006/003116 A1 | 1/2006 |
| WO | WO 2006/045515 A2 | 5/2006 |
| WO | WO 2006/066626 A1 | 6/2006 |
| WO | WO2008/037642 A2 | 4/2008 |

OTHER PUBLICATIONS

Notice of Opposition against European Patent No. EP 2 068 684, dated Nov. 16, 2011.

Reply of the patent proprietor to the Notice of Opposition to European patent No. 2 068 684, Jul. 2, 2012.

Notice of Opposition to granting of European patent No. 2 068 684 (with English translation), Oct. 5, 2012.

* cited by examiner

EXTRACTION SYSTEM FOR THE PREPARATION OF A BEVERAGE FROM A CARTRIDGE

This application is a 371 filing of International Patent Application PCT/EP2007/059930 filed Sep. 20, 2007.

The invention relates to the field of the preparation of beverages from a cartridge in an extraction device designed to accept such a cartridge; the device/cartridge assembly usually being termed the extraction "system".

The technological background of the invention relates to the field of cartridges containing edible ingredients such as ground coffee and which are extracted under hot water pressure in an extraction device. The hot water is injected into the cartridge via an injection face using a piercing system, for example, the pressure of the fluid increases in the cartridge until another face of the cartridge is perforated or pierced by perforating means under the effect of the pressure so that the extract is delivered from the cartridge. A multitude of reliefs belonging to the perforating means allows controlled openings to be formed in the face of the cartridge while at the same time filtering the extract enough that the coffee grounds are kept inside the cartridge.

A system such as this employing this method is known, for example, from patent EP-A-512470.

Patent application EP 1 654 966 proposes an improvement for providing better sealing upon closure of the extraction system so as to better control the extraction characteristics, particularly the opening and extraction pressures. To do that, the cartridge is equipped with an attached seal or a seal that forms an integral part of the cartridge so that each new cartridge extracted seals perfectly into the extraction system, thereby avoiding any risks of water leaking through the cartridge nip region to the outside. In the known systems, the seal is generally supported by the device, and this may present problems of wear and also of soiling that can then cause the extraction conditions to vary. Another advantage of the invention is that it allows the cartridge to be released more easily by preventing the cartridge from "sticking" in the cartridge cage through the effect of suction or vacuum. To do that, the invention may provide air passages such as grooves on the bearing surface of the cartridge cage.

In order to obtain a satisfactory seal, the seal supported by the cartridge needs to include a sufficient thickness of deformable material. This seal needs to be sized in such a way that it is compressed enough to fully compensate for any separation after closure and when the device is at its maximum pressure during extraction. Now, it has been found that the injection pressure, which may be as much as 12-20 bar, tends, at these high pressure levels, to cause the device to open up by the order of a few tenths of a millimeter at the cartridge nip region. The seal needs therefore to be able to compensate for such "dynamic" separation. If the seal is not tall enough, there is then insufficient compensation and leaks occur meaning that the increase in pressure in the cartridge cannot occur correctly.

However, increasing the thickness of the seal in order to solve this problem of separation leads to additional cost in the production of the cartridge.

In general, it is also advantageous also to reduce the stresses exerted on the closure mechanical transmission device in order to slow the mechanical rate of wear and make closure easier, or alternatively, to allow the use of a lower powered motor.

It is an object of the present invention to provide a solution to these problems.

In particular, one of the objects of the invention is to retain the advantages of a seal associated with the cartridge while at the same time providing a solution to the problem of dynamic separation under the effect of the internal pressure during extraction.

To do this, the invention relates to a extraction system for preparing a beverage from a cartridge using a fluid injected under pressure into the said cartridge and comprising:
  a cartridge comprising:
    a beverage delivery wall which can be perforated under the effect of the pressure of the injected fluid within the cartridge,
    a wall for injecting the fluid into the cartridge,
    a nip region,
    an extraction device intended to accept the said cartridge and comprising:
    an injection cage comprising fluid injection means, and
    a cartridge support comprising perforating means for perforating the delivery wall of the cartridge under the effect of the pressure of the fluid in the cartridge;
  the said injection cage and the said cartridge support being arranged in such a way as to be moved relative to one another by a closure device which closes them around the cartridge prior to injection, and to trap the cartridge in the said nip region,
characterized in that:
the injection cage comprises a base and a closure piston unit which is mounted so that it can move axially with respect to the said base;
the said closure piston unit can move relative to the base under the effect of the pressure of the fluid against the nip region of the cartridge in order to generate clamping forces that prevent the injection cage and the cartridge support from opening up relative to one another as the system is pressurized.

According to the invention, the cartridge seal forms a thickness of material that can be deformed under the effect of its being trapped in the device.

As a preference, the seal is softer than the cartridge support with which the seal is in contact in the nip region of the cartridge and than the nip surface of the piston unit. For example, the support is typically a nipping edge of the cartridge. The nip surface of the piston unit may be made of a rigid material such as a metal or a plastic that cannot be deformed under the effect of the closure forces and the heat of the fluid.

The seal is preferably of a thickness of 0.8 mm or less, and preferentially, of a thickness of between 0.2 and 0.6 mm. A thickness of this order of magnitude makes it possible to avoid the use of a seal in the device while at the same time offering dynamic sealing able to withstand high pressures, for example pressures ranging between 12 and 20 bar.

The cartridge seal may be made of an elastically deformable material in order more readily to compensate for any possible opening-up at the nip surface of the cartridge cage. Examples of deformable materials for the seal may include elastomeric materials such as TPE (thermoplastic elastomer), LSR (liquid silicone rubber, silicone or EPDM.

In some cases, the seal may also be made of a deformable, but slightly elastic, material, such as synthetic fibres, cellulose, foam, plastic or mastic.

The seal may be an element that is prefabricated and assembled with the cartridge by any means of connection or alternatively may be co-manufactured with the cartridge. The seal may be an O-ring seal assembled with the cartridge. It may be fixed to the cartridge by bonding, welding or any other means of connection. It may also be deposited in liquid form and polymerized in situ or co-injected or over-injected according to the material of which the cartridge is made. The seal may also form an integral part of a wall of the cartridge and be formed of the same material, of plastic for example.

As far as the extraction device is concerned, this comprises an injection cage comprising a base and a closure piston unit. The closure piston unit is able to move with respect to the base under the effect of the fluid upon injection.

The injection cage in general comprises an internal extraction cavity of a shape designed to at least partially accept the contour of a cartridge, at least one fluid supply duct which supplies the cavity with fluid, possibly at least one opening means, such as a piercing element, allowing the cartridge to be opened so that the fluid can be introduced into the cartridge.

The term "fluid" relates more specifically to hot water but the use of other liquids such as food liquids is not precluded.

According to one feature, the piston unit is mounted with respect to the base so as to move coaxially therewith; the said unit defining, with the base, a pressure chamber the volume of which can expand; the expansion of the pressure chamber under the effect of the fluid having the effect of driving the said piston unit back towards the cartridge, and the said unit comprising a nip surface exerting closure forces against the cartridge seal in the cartridge nip region under the effect of the thrust exerted by the fluid on the piston unit.

According to one feature of the invention, in order to provide a seal between the pressure chamber and the outside, at least one sealing means is provided between the piston unit and the base.

According to another feature, an incompressible elastic thrusting means is provided in the pressure chamber and is elastically deformable and at least partially occupies the pressure chamber; this elastic means is arranged in the pressure chamber in such a way as to be deformed by the fluid and thus be able to apply axial thrusting forces against the action of the piston unit. According to one possible embodiment, the elastic means completely occupies the pressure chamber when the pressure chamber is in the position of rest. The object is to reduce the volume occupied by the fluid in the pressure chamber replacing the volume thereof with the elastic means. The elastic thrusting means absorbs the forces exerted by the pressurized fluid and transmits them to the piston unit. The advantages are better ability to control the closure forces (for example by providing materials of different hardnesses), of reducing fluid stagnation regions and preventing the pressure chamber from becoming soiled with food residue such as coffee grounds.

The incompressible elastic thrusting means may thus be made of a silicone material or of some other elastomer. The hardness of such a material is adjusted to suit the desired performance and the desired closure forces to be transmitted.

According to one possible embodiment, the incompressible elastic thrusting means comprises a first surface on which the fluid pressure is exerted, extending radially, and a second, thrust, surface extending transversely so as to exert axial thrust on the piston unit.

According to one possible embodiment, the sealing means and the elastic means are one and the same element.

The (projected) thrust surface of the piston unit, on which surface the pressure of the fluid outside the cartridge is exerted in order to perform closure is larger than the delivery surface of the cartridge. As a result, by providing a ratio of surface areas that is always in favour of the thrust surface, the separation forces tending to try to open up the device remain lower than the forces which close the device around the cartridge. As a preference, the thrust surface is about 1.2 to 2 times the size of the delivery surface.

According to a first embodiment, the pressure chamber forms a continuation of the extraction cavity. The pressure chamber is then fed directly with fluid through at least one opening or a channel of the extraction cavity. The pressure chamber is preferably an annular continuation of the extraction cavity.

In this case, the piston unit partially constitutes the extraction cavity so that the piston unit and the base together define the surfaces of the extraction cavity. In this case, the base comprises a fluid supply duct communicating directly with the extraction cavity. The base also preferably comprises at least one opening means, such as a piercing element for example projecting into the extraction cavity. The piston unit preferentially constitutes the lower (nip) part of the extraction cavity. It then comprises at least a substantially cylindrical or frustoconical part internally matching the external shape of the cartridge. In this case, the pressure chamber is preferably a substantially annular chamber positioned around the extraction cavity in order to extend it radially. A configuration such as this allows the bulk of the device to be reduced considerably.

According to this same embodiment, the fluid is supplied to the pressure chamber by a plurality of openings or channels positioned radially between the extraction cavity and the annular pressure chamber. An arrangement such as this makes it possible to guarantee a uniform pressure increase in the chamber and therefore closure forces that are well distributed around the periphery of the nip surface. For example, the channels are of an open configuration and are arranged on one of the edges between the piston unit and the base so as to prevent them from possibly becoming blocked with scale or solid coffee particles. In this case, as the piston unit gradually moves away from the base, the openings or channels become larger and the chamber supply surface increases accordingly.

According to a second possible embodiment, the pressure chamber extends upstream of the extraction cavity.

In this case, the piston unit may entirely form the extraction cavity for accepting the cartridge so that the cavity of the piston unit is able to move relative to a base. In this case, the pressure chamber is supplied via at least one fluid channel situated in the base and upstream of the chamber. The extraction cavity is then itself supplied via the pressure chamber through at least one fluid channel formed through the piston unit.

According to another advantage, means for detaching the cartridge provided, thereby avoiding a vacuum effect in the nip region. To do that, the nip surface of the piston unit preferably forms discontinuous nip portions for trapping the nip region of the cartridge.

In particular, the nip surface of the piston unit comprises open grooves extending radially and separating the said discontinuous portions. The size of the grooves depends on the size of the cartridge seal. As a preference, the grooves are of a height that can be compensated by the thickness of the seal, which height is less than the thickness of the seal. As a preference, the height (H) of the grooves is equal to less than $2/3$ of the thickness of the seal, preferably equal to about half the thickness of the seal. For example, the groove height is about 0.1 to 0.4 mm. The groove width is also preferably between about 0.8 and 3 mm.

The extraction device is associated with a closure device for closing the injection cage and the extraction support around the cartridge before the pressure is increased. This closure may be considered as a "pre-closure" in as much as a certain closure force is already applied to the cartridge in the nip region by the device before the fluid pressurizes it. The closure device may be a mechanical, hydraulic or hydro mechanical device. It may also be a manually operated system or a system operated by a motor.

The invention will be better understood and other features will become apparent from the detailed description of the attached drawings.

DETAILED DESCRIPTION OF THE INVENTION

Figure 1:
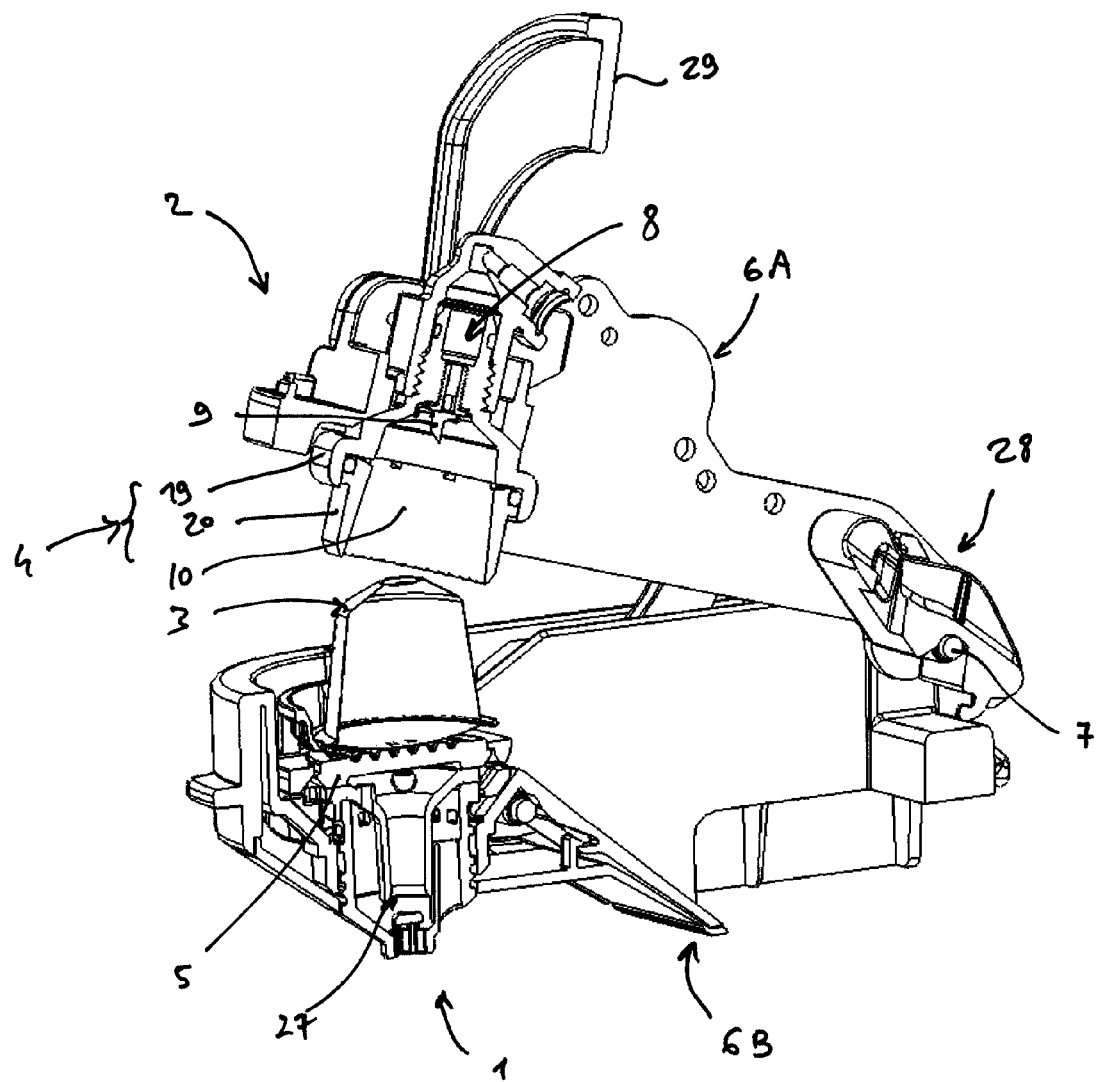
FIG. 1 is a view in section and in perspective of the extraction system according to the invention, depicting the system in a first state of operation, in particular, in the opening mode with the insertion of a cartridge in the extraction device.
Figure 2:
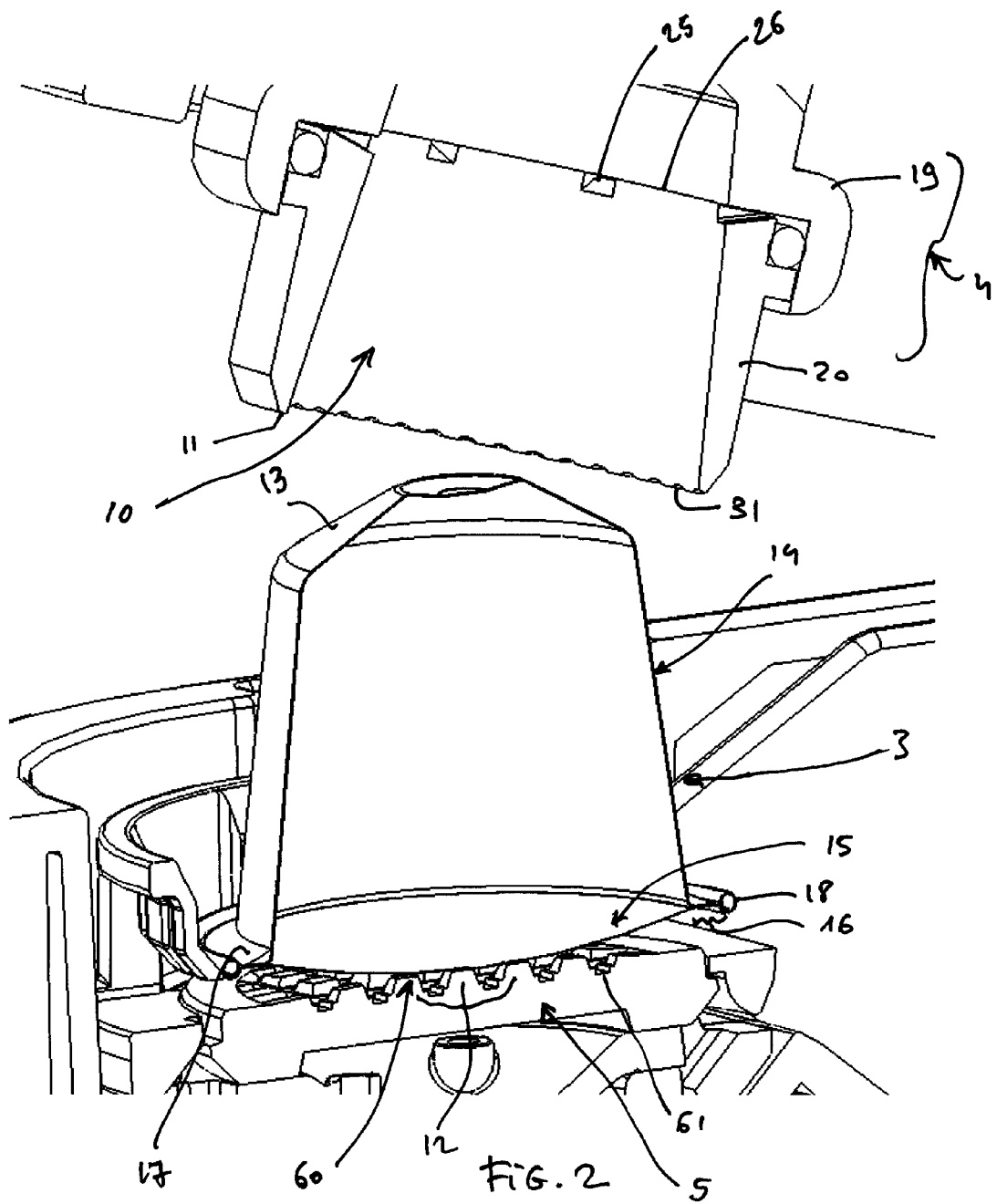
FIG. 2 is a perspective view of part of the system in its state according to FIG. 1.

With reference to FIGS. 1 and 2, the extraction system 1 according to the invention, as depicted by way of nonlimiting example, is made up of an extraction device 2 in which there is housed a cartridge 3 containing a food ingredient for preparing a beverage. Preparation is typically obtained by injecting a pressurized fluid into the cartridge and extracting the ingredient under the pressure of this fluid. The cartridge is a disposable cartridge and the spent cartridge is therefore generally thrown away or recycled. A new cartridge is then inserted into the device.

The "device-cartridge" assembly is known as the "extraction system" in the context of the present application. As will become obvious in what follows of the description, the device and the cartridge constitute means which cannot operate without one another and which interact physically and to complement one another in order to extract the liquid extract that is intended to form the beverage.

The extraction device as such is an assembly comprising an injection cage 4 and a cartridge support 5. The injection cage and the cartridge support are able to move relative to one another to close up around the cartridge 3. In this instance, the injection cage 4 is mounted on a mobile upper structure 6A, while the cartridge support 5 is mounted on a fixed lower structure 6B; the upper structure moving closer to the lower structure through a pivoting movement about an axis of articulation 7. The opposite could be anticipated, that is to say a cartridge cage that was fixed and a cartridge support that was able to move or alternatively, it could be anticipated for the two parts to move one towards the other. The dynamics governing the closing-up of the injection cage and the cartridge support is subject to numerous possible variants. Indeed, dynamics in which the parts move closer together in a linear path (rather than in a non-linear curve) is one possible variant.

The injection cage means the part containing means for injecting a pressurized fluid into the cartridge. These means usually comprise at least one main fluid supply duct 8 and means of opening the cartridge. The opening means may, for example, be piercing elements 9 whose function is to create one or more openings in the cartridge in order to allow the fluid in. The piercing means may be separate from the duct 8, as illustrated. They may, for example, be elements in the form of blades, needles or spikes. In one variant, the duct may continue through the piercing element as such. Other opening means may be anticipated, according to the nature of the cartridge.

The injection cage has an internal cavity 10 which accepts the injection face of the cartridge upon closure. The internal cavity 10 may vary in depth according to the shape of the cartridge. The free end of the cage has a nip surface 11. The injection cage is connected to a system for supplying the device with fluid which, in FIG. 1, is depicted only in part for purposes of simplicity. The fluid supply system generally comprises a water tank, a pressure pump and ducts for transporting the fluid, a water heater, such as a thermobloc, for example, to convey the fluid at the desired temperature for extraction. The pump may be an electromagnetic piston pump capable of developing a static pressure of several bar or any other type of equivalent pump.

The cartridge support 5 has an extraction surface 60 allowing the cartridge to be perforated under the effect of the increase in pressure in the cartridge. To do that, the surface has at least one relief, preferably a series of reliefs 12, forming means of perforating the cartridge. The reliefs may differ in geometry according to the type of cartridge and the desired extraction conditions. In the example, each relief in the shape of a truncated pyramid. A network of channels 61 is formed through which the liquid extract can flow between the structure of reliefs so that liquid can be collected in a container (cup or the like).

As shown in FIG. 2, the cartridge 3 according to the system of the invention has an injection wall 13 which may be closed at the time the cartridge is inserted into or deposited in the device. The injection wall may be formed in a dished body 14 (for example in the shape of (a) cone frustum(s)). The cartridge has a delivery wall 15 through which the extract needs to be able to flow once openings have been made by the perforating means 12 of the extraction surface of the support. A wall 15 such as this may be a membrane made of aluminium, plastic or plastic/aluminium laminate and which can be perforated. For example, the wall is an aluminium foil a few tenths of a micron thick which tears when it reaches its rupture stress upon contact with the reliefs 12 at a pressure that may range between 6 and 20 bar depending on the cartridge, the ingredients and the thickness of the membrane. The body of the cartridge may be made of a rigid or semirigid material such as aluminium, plastic or a plastic-aluminium laminate.

The cartridge comprises a nip region 16 via which it is trapped when the device is closed onto the cartridge. Trapping is achieved by bringing the injection cage 4 and the extraction support 5 closer together and then clamping them on either side of the said nip region 16. The nip region 16 is formed of a border running radially around the periphery of the cartridge. The border may, at least in part, be formed of the body of the cartridge. The membrane 15 may be assembled with the underside of the border in the nip region 16 by sealing or welding. According to one embodiment of the invention, the nip region comprises a sealing means in the form of a seal 17 which occupies all or some of the border. The seal 17 is preferably an element made of a deformable material that is relatively soft and attached or fixed against the rim. A relatively soft material is to be understood as meaning a material capable of deforming in order to thereby compensate at least for any opening up of the injection cage at the nip surface as will be explained hereinafter. As a preference, the seal is made of an elastic material such as an elastomer. The thickness of the seal is preferably 0.8 mm or less.

The shape of the seal may be designed in such a way as to encourage it to creep as the pressure rises, so as to provide a better seal uses a minimum amount of material. In the example illustrated, the seal has a greater thickness on the rim facing towards the wall of the body 14 of the cartridge than it does towards the free end of the rim thus allowing the material to move outwards under the effect of the pressure of the fluid thrusting against the cavity and the wall of the cartridge. The thickness of the seal on the side wall side may be about 0.5 mm and decrease towards the outside to a value ranging between 0 and 0.2 mm. The rim of the cartridge may end in a crimped seam 18 as is known per se, and to which the trapping forces are not, in theory, applied.

Figure 3:
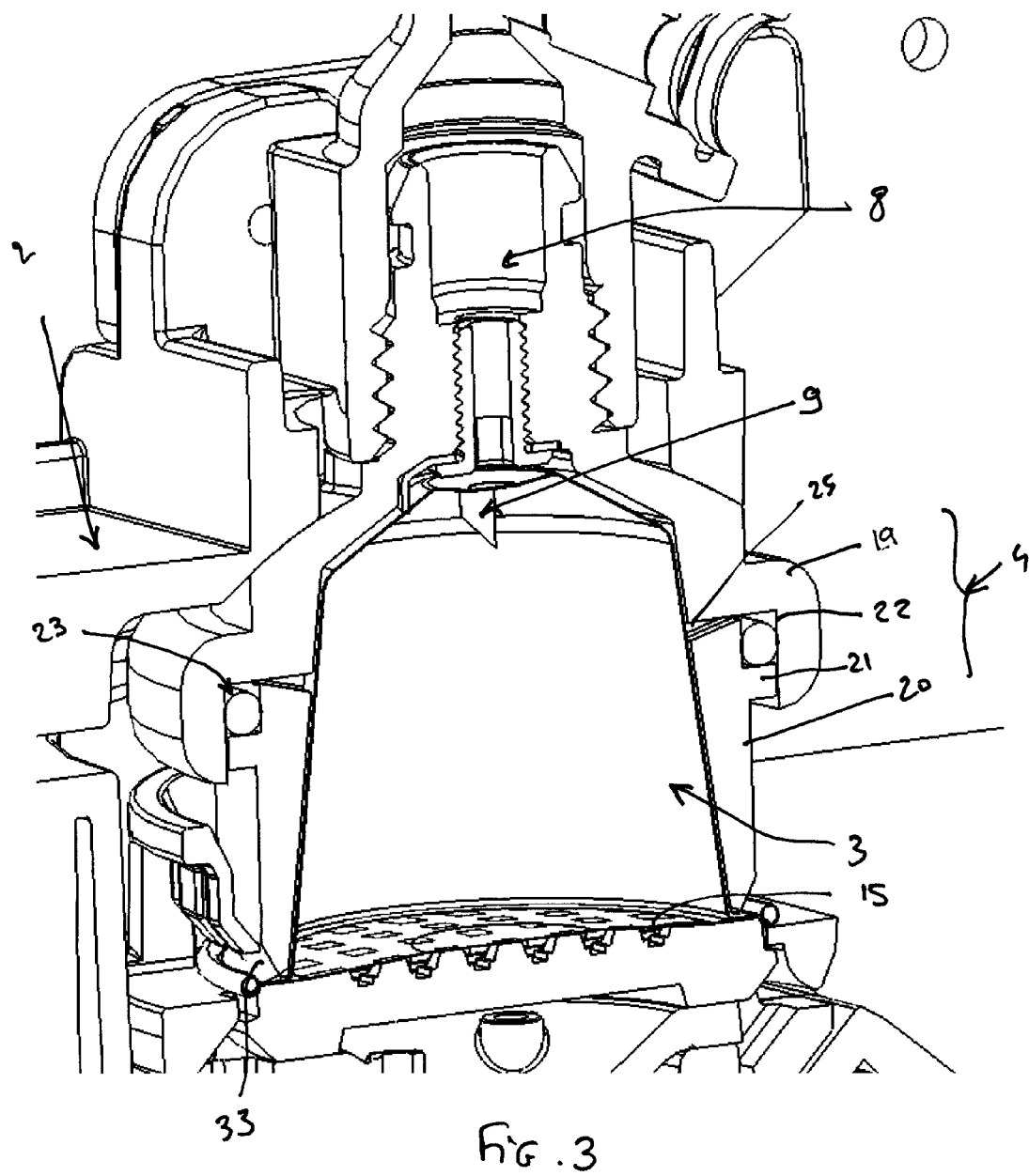
FIG. 3 is a view similar to FIG. 2 but in a second operating state, particularly in the closure mode and before the system is pressurized.
Figure 4:
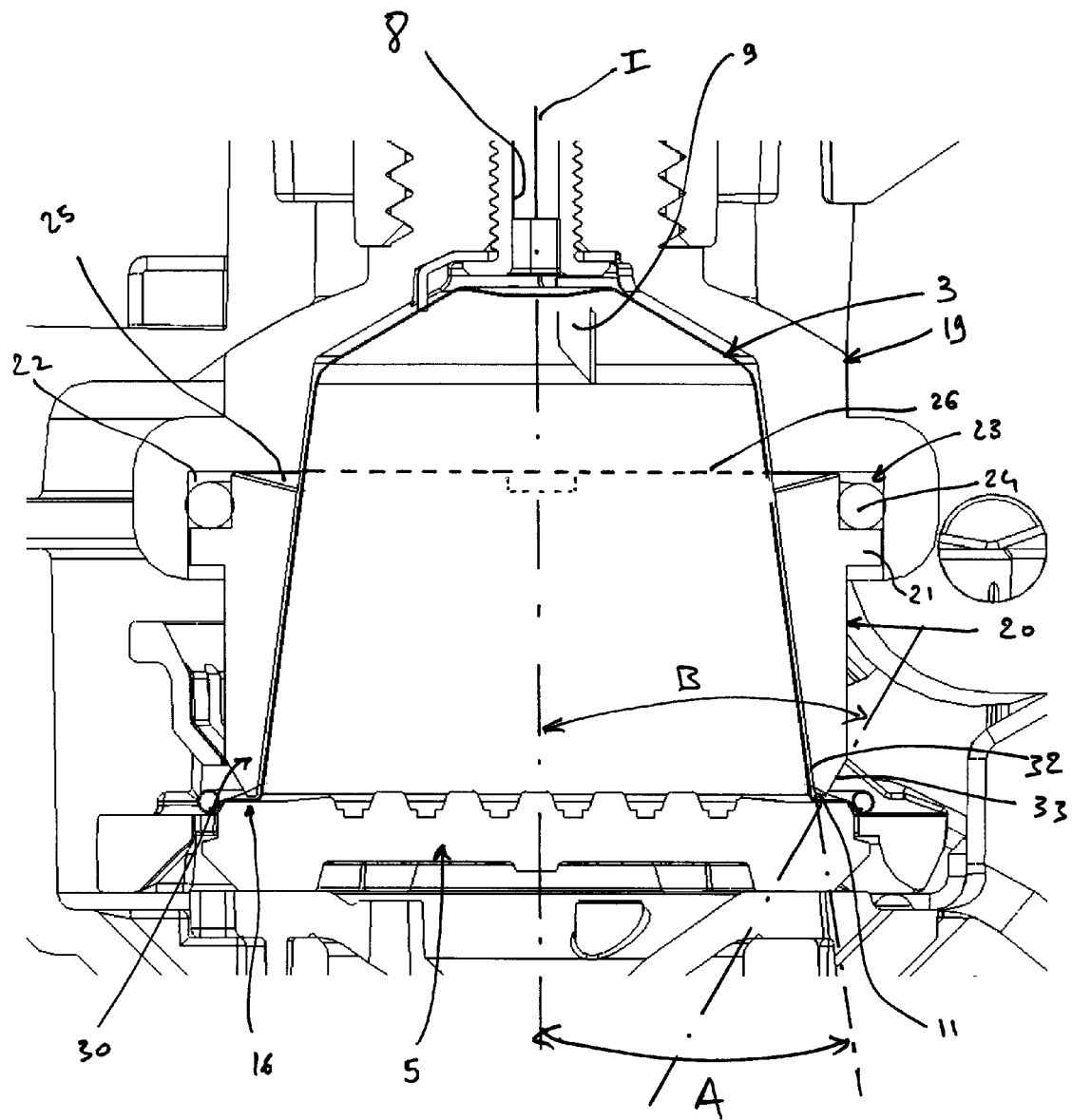
FIG. 4 is a detailed sectional view of the system in the closure state according to FIG. 3.

According to the invention, the injection cage is designed to be pressurized in such a way as to increase the closure forces against the nip region after the device has been mechanically closed. To do that, the injection cage comprises a base 19 and a piston unit 20 which is mounted axially with respect to the base with the ability of controlled movement. As FIGS. 3 and 4 show, the piston unit comprises a lateral rim 21 which fits into a groove 22 formed in the base 19. The rim/groove assembly defines a pressure chamber 23 the volume of which can expand. The chamber may be partially occupied by a sealing means 24 such as an elastic block that seals the chamber against the outside at the rim/groove interface. The fluid is conveyed into the chamber from the internal extraction cavity by starter channels or channels 25. These may, for example, be formed on the line 26 where the piston unit and the base that forms the top of the cavity meet. In the example illustrated, we have starter channels forming notches widening towards the cavity and positioned on the upper rim of the piston unit 20. They could also be formed at least partially on the lower rim of the base. The channels or starter channels 25 are radially arranged and distributed uniformly about the periphery of the cavity so as to balance the pressurizing of the chamber and allow the piston unit to move as linearly as possible along the base.

Figure 5:
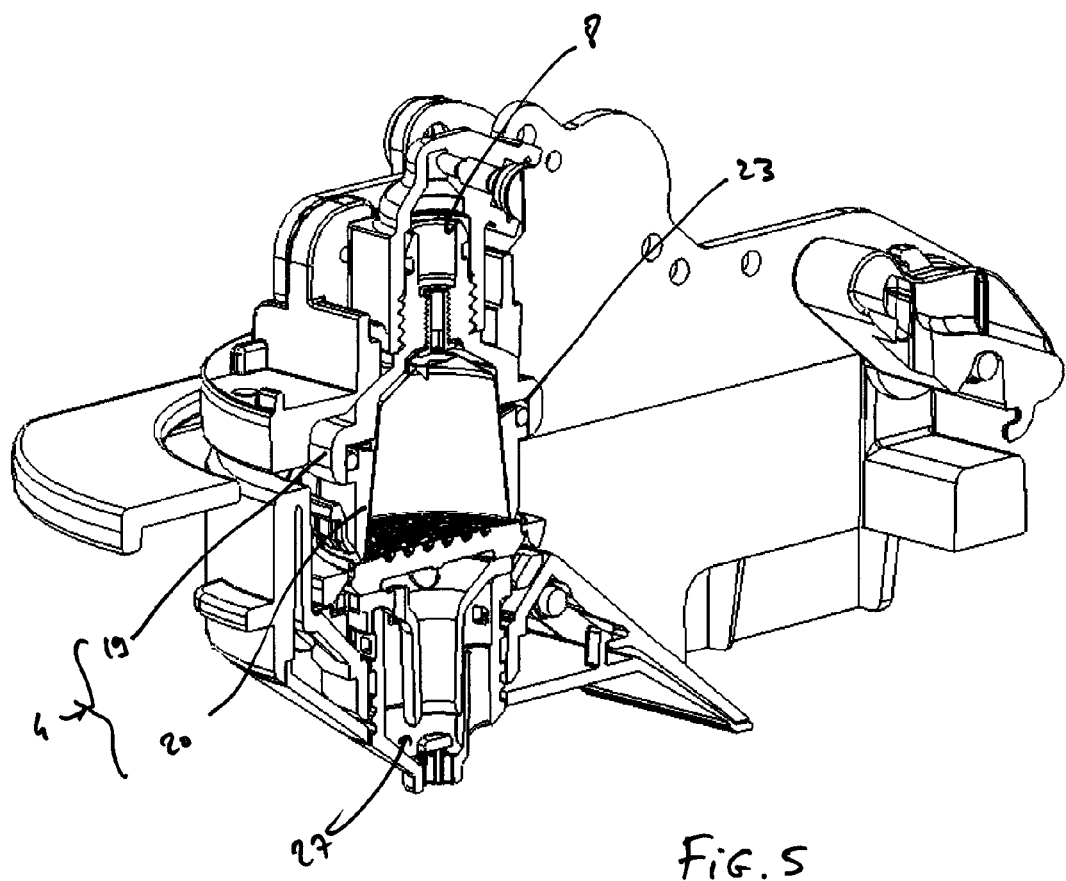
FIG. 5 is a view in section and in perspective of the extraction system in a third operating state, in particular, when the system is under pressure.

The device also comprises means 27 for collecting and delivering the liquid extract, these being positioned downstream of the extraction support (FIGS. 1 and 5). These means, known per se, for example comprise a funnel-shaped collector and possibly a jet-regulating element.

The device is equipped with a mechanical closure device 28 as known per se. A device such as this need not be described in detail in this application. It may be based on a mechanism for transmitting a force from a manual lever 29 or motor (not illustrated) to the structure supporting the injection cage. A mechanism such as this may be a mechanism employing the principle of a latch lock lever such as, by way of example, the one described in Patent Applications EP 1090574 or alternatively EP 1495702. It may also be a cam mechanism, a mechanism involving an electromagnetic field (solenoid) and/or a hydraulic mechanism.

FIGS. 3 and 4 show the extraction system after the device has been closed around the cartridge using the closure device 28. The lever 29 is actuated to bring the injection cage 4 closer to the extraction support to the point that the nip region 16 of the cartridge is firmly trapped. In this operating state, the cavity moves towards the cartridge, thus forcing the piercing elements 9 through the injection wall of the cartridge 3.

As shown by FIG. 4, the piston unit is extended towards its free end 30 by a nip surface 11 which applies clamping forces to the cartridge seal as a result of the mechanical closure. It may be noted that the seal is already preloaded and is compressed to a certain degree. The extraction support serves to produce opposing forces to trap the rim and immobilize the cartridge in the said region.

As a preference, the nip surface 11 has discontinuous nip portions which between them delimit grooves 31 (FIG. 1) running in the radial direction with respect to the axial line I of the surface of revolution formed by the extraction cavity. The number of grooves 31 may vary but, as a preference, is greater than 10, even greater than 20. The grooves are preferably distributed about the entire periphery of the nip surface.

As a preference also, the end of the piston unit ends in a nip surface with internal 32 and external 33 edges converging towards one another to form a relatively narrow and localized surface 11. The width of the nip surface 11 is preferably equal to 1 mm or less. Likewise, the nip surface preferably exerts forces closer to the lateral wall of the body of the cartridge than to the free edge of the border. The narrow width of the nip surface means that locally higher forces can be applied and also makes it possible to minimize the thickness and/or the width of the seal while at the same time ensuring a good seal. As a preference, the internal edge 32 makes an angle A smaller than the angle B of the external edge 33 (A and B being referenced with respect to the axis I). The angle A preferably ranges between 5 and 10 degrees while the angle B ranges between 30 and 60 degrees.

In the operating state of FIGS. 3 and 4, no fluid has yet been injected through the duct and the piston unit is in the retracted position. The pressure chamber 23 has not yet been subjected to the pressure of the fluid.

Figure 6:
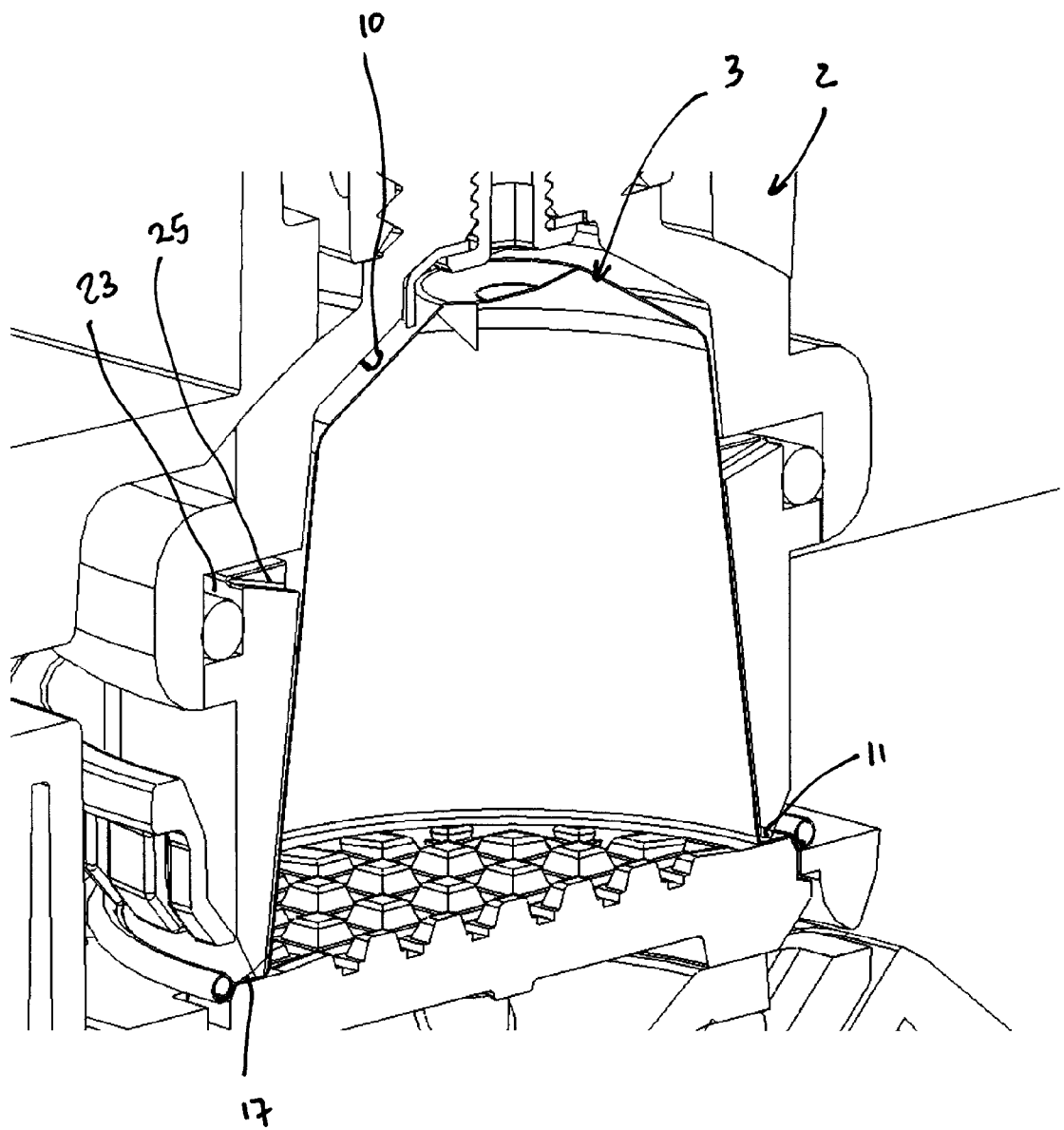
FIG. 6 is a detailed perspective view of the system under extraction pressure (without the cartridge membrane)

FIGS. 5 and 6 show the extraction step proper. An injection fluid is sent through the supply duct 8 by the pump of the device until the pressure in the cartridge 3 and the internal cavity increase. The pressurized fluid fills the cavity, the cartridge and the pressure chamber through the starter ducts and along the meeting line 26 as the piston unit moves to close up against the seal and the rim of the cartridge. The pressure chamber expands under the effect of the pressurizing of the fluid in the cavity and in the cartridge. The projected axial surface at the pressure chamber is appreciably larger than the delivery surface of the cartridge which means that the clamping forces exerted on the nip surface by the piston unit always remain higher than the separating forces exerted at the nip region but on the internal cavity side (between the wall of the cartridge and the cavity). Thus, the seal created is maintained throughout the extraction process.

During the extraction process, thanks to the fact that sealing is maintained, the pressure exerted on the membrane against the reliefs reaches a value (ranging between about 6 and 20 bar according to the cartridge) such that it leads to the tearing of the membrane against the reliefs reaching the rupture stress of the material of the membrane. The membrane therefore tears in a controlled and localized way to form openings at the corners of the reliefs. In some cases, the pressure in the cartridge may continue to increase appreciably because of any possible compaction of the bed of coffee in the cartridge. The extraction is filtered by the membrane and by the reliefs. The extract is collected in the channels of the extraction support as far as holes (not featured) made through and/or on the sides of the support.

Figure 7:
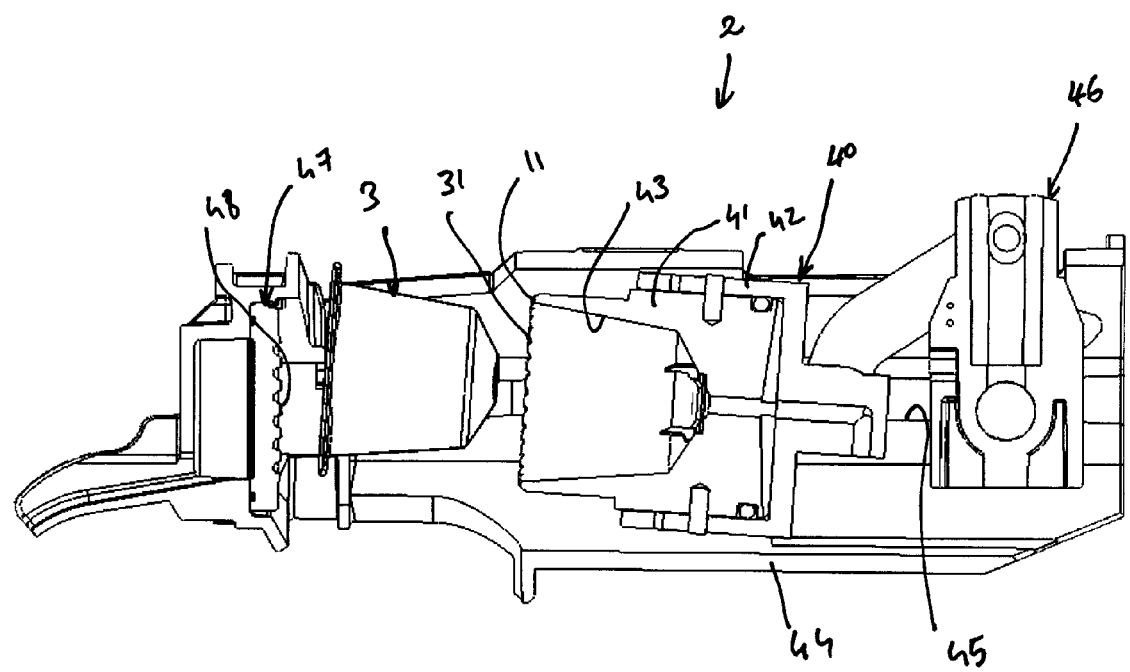
FIG. 7 is a side view in cross section of an extraction system according to a second embodiment depicting the invention in the mode of opening and inserting a cartridge into the extraction device.
Figure 8:
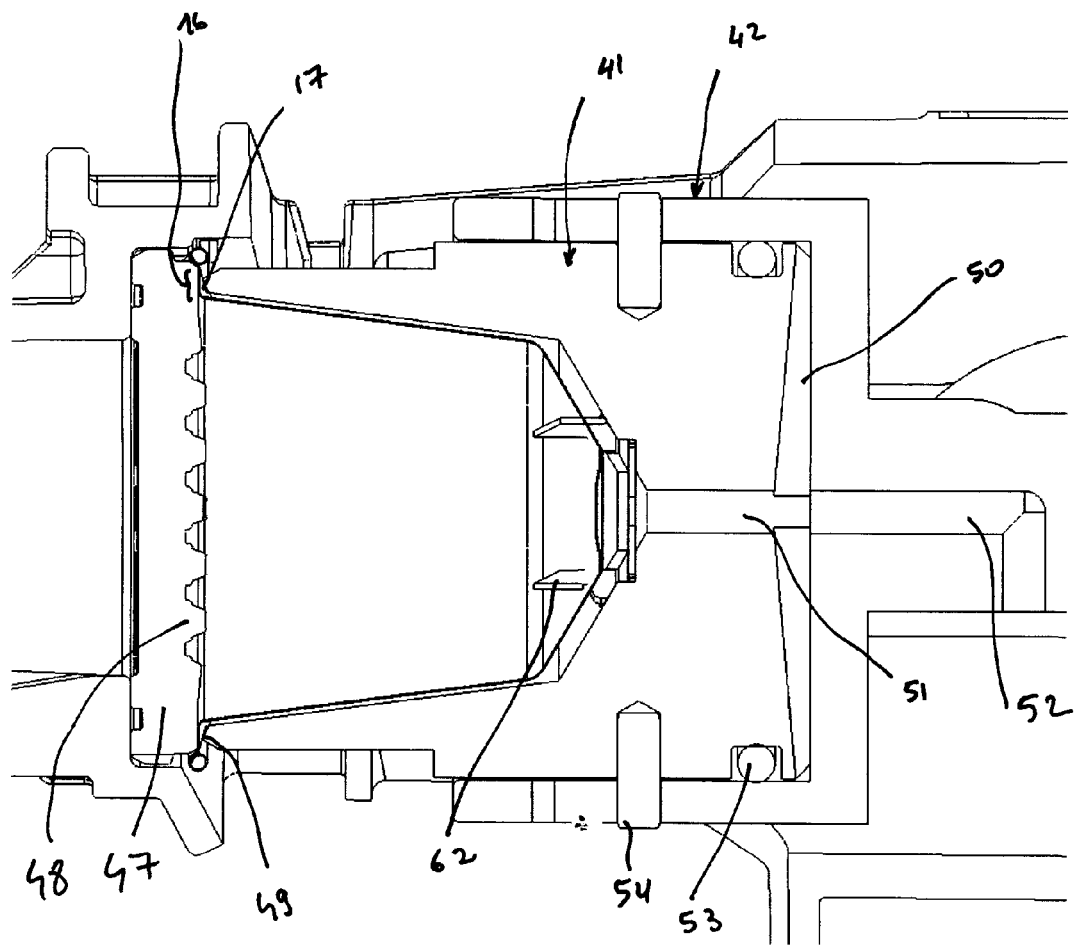
FIG. 8 is a detailed sectional view of the system after mechanical closure but before the system is pressurized.
Figure 9:
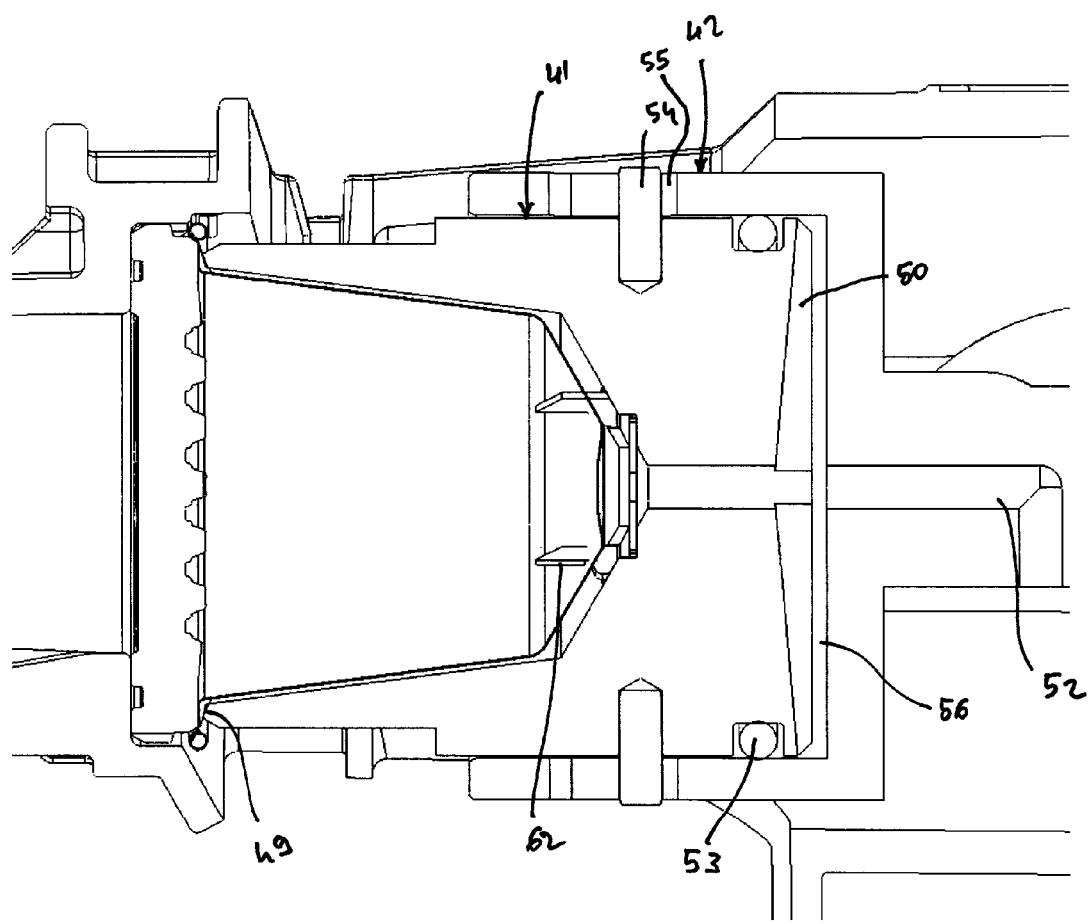
FIG. 9 is a detailed sectional view of the system as the system is pressurized.

FIGS. 7 to 9 show another possible embodiment in which the injection cage 40 is formed of a piston unit 41 which is guided axially in a base 42, the said piston unit 41 completely forming the internal cavity 43. The cartridge 3 for its part is identical to the system of the preceding embodiment.

The injection cage 40 is mounted such that it can move in a structure 44 between an open position (FIG. 7) and a mechanically closed position (FIG. 8). The injection cage is thus held and guided in its movement by guide means 45 formed on the sides of the structure and complementing the cage guide means (for example, a rib/groove assembly) thus allowing it to move from one position to the other by actuation of a closure device 46. The closure device is of the latched lock lever type, for example, and is actuated by a lever or motor (not illustrated). A cartridge support 47 is provided, and the cartridge will rest against this once the injection cage 40 has been closed and the nip region 16 of the cartridge has been trapped.

The cartridge support 47 comprises a structure in relief 48 for opening the delivery face of the cartridge, and identical to the one in the previous embodiment.

As before, the moving piston unit 41 has a solid nip surface 49 which exerts pressure on the cartridge seal 17.

As shown by FIG. 8, the piston unit comprises radial grooves 50 which act as starter channels for the passage of fluid and the creation of a pressure chamber 56 between the piston unit and the base. The grooves 50 extend from a central supply duct 51 formed in the piston unit. The central duct 51 communicates with a master supply duct 52 formed in the base 42, and itself supplied by pressurized-fluid supply means situated further upstream (pump, water heater, etc.).

A seal 53, such as an O-ring seal, is also provided between the base and the piston unit to prevent any leaks to the outside. For that, the piston unit comprises an annular groove in which the O-ring seal is housed. Likewise, the travel of the piston unit is controlled by stop means between the base and the unit. These are, for example, pegs 54 running in slots 55 of the base. This makes it possible to prevent the piston unit becoming detached from the base.

The piston unit 41 of the injection cage is in the shape of a bell comprising a closed end in which means piercing the injection face of the cartridge are formed.

In the operating state of FIG. 8, the injection cage is closed up against the cartridge and the extraction support by the closure means 46. Only mechanical pressure of the nip surface 49 of the piston unit is exerted on the cartridge seal 17.

In the operating state of FIG. 9, the system is pressurized with fluid and the piston unit is driven back, exerting additional clamping forces on the cartridge seal 17.

Figure 10:
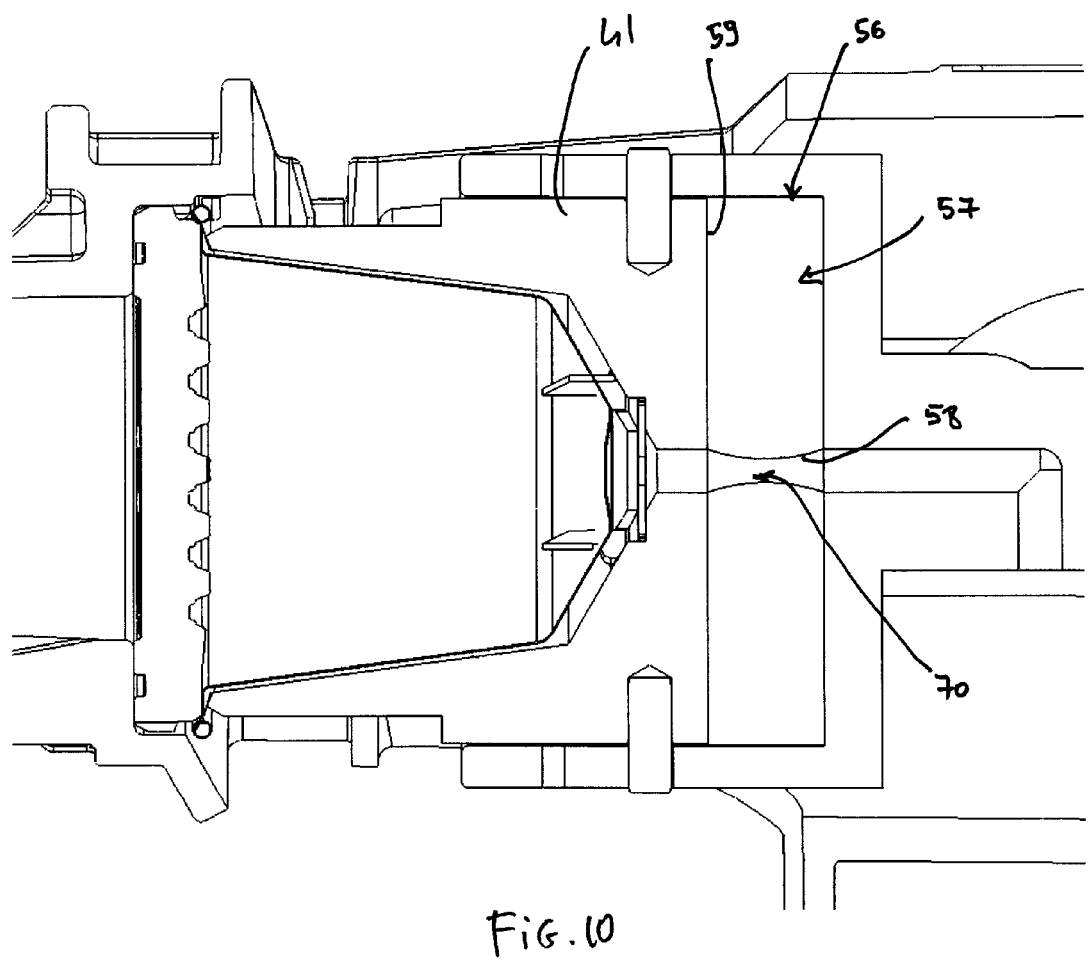
FIG. 10 is a detailed sectional view of a third embodiment after mechanical closure but before the system is pressurized.
Figure 11:
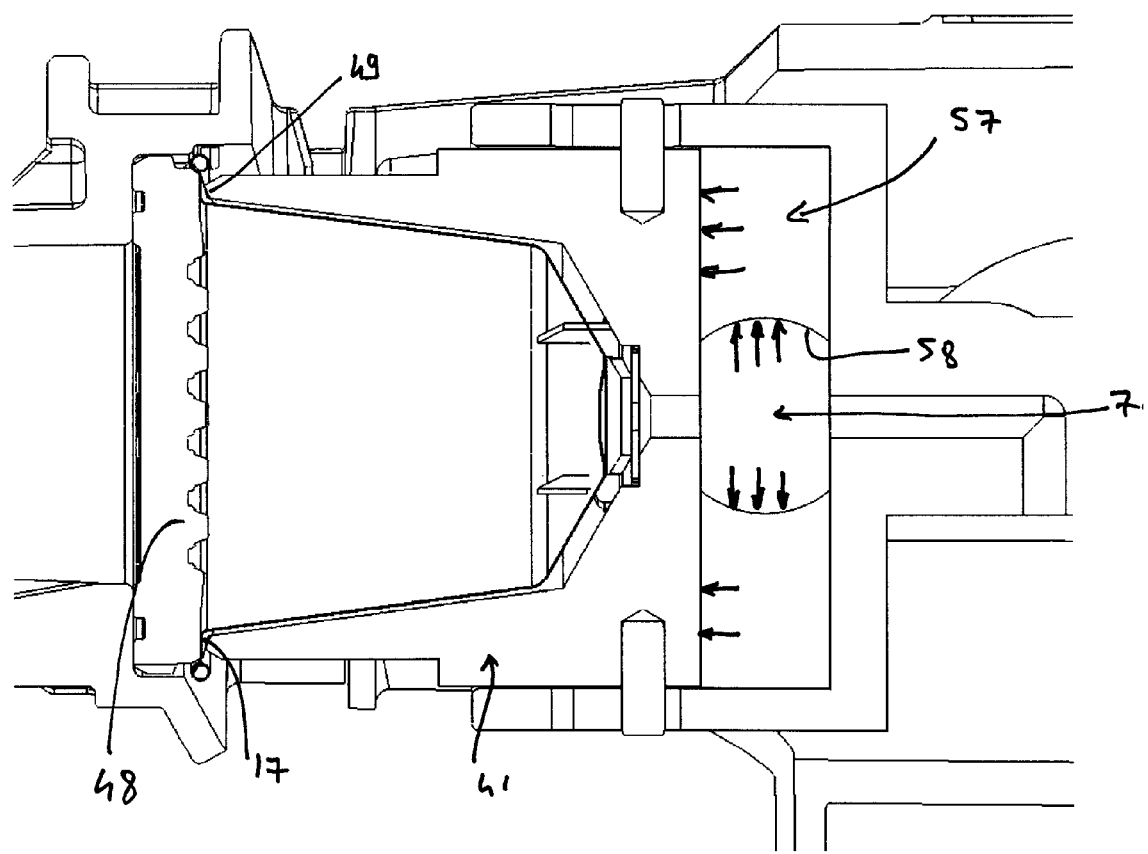
FIG. 11 is a detailed sectional view according to the embodiment of FIG. 10, once the system has been pressurized.

FIGS. 10 and 11 illustrate another alternative form in which the pressure chamber is occupied by an incompressible elastic thrusting means 57. This means occupies the pressure chamber in the retracted position thereof (that is to say before pressurizing is performed). The incompressible elastic thrusting means comprises a first surface 58 on which the fluid pressure is exerted and which extends radially, and a second, thrust, surface 59 which extends transversely in order to exert thrust axially on the piston unit 41. The thrust surface 58 delimits an expanding duct 70 which passes through the unit to allow fluid to pass to the internal cavity. The external surface of the unit on the opposite side to the surface 58 is, for its part, blocked off by the internal surface of the piston unit. The unit therefore has a tendency to deform, thereby exerting axial thrust.

An incompressible elastic thrusting means such as this may be a block of deformable but relatively incompressible material. Since the block is made of a deformable material such as a silicone elastomer and occupies substantially the entire volume of the pressure chamber, it experiences a deforming thrust in a substantially radial direction of the duct 70 (FIG. 11) from a rest position (FIG. 10). The initial thrust surface on which the fluid pressure is exerted is substantially equal in size to the internal annular surface of the elastomer block. The thrust from the fluid is therefore substantially radial. Since a block such as this is incompressible, its external surface is compressed against the internal surface and the end surface of the piston unit in such a way that an axial thrust is absorbed perpendicular to the radial thrust of the fluid and therefore exerted on the piston unit in the direction of the nip region 16. The piston unit therefore moves towards the nip region, exerting forces that cause it to close against the seal 17.

In general, the invention can be applied to any mechanical device for closing the extraction device in order to reduce the closure forces. For example, the reduction in closure forces makes it possible to use a motor rather than a manually-operated closure device (such as a lever). The assistance afforded by the hydraulic means thus described allows the force needed for mechanical closure to be reduced considerably. This application can be envisaged for an extraction system that uses cartridges with or without seals. In the case of sealless cartridges, sealing has then to be provided by a seal formed on the injection cage.

The invention claimed is:

1. An extraction system for preparing a beverage from a cartridge using a fluid injected under pressure into the cartridge, comprising:
    a cartridge comprising a beverage delivery wall which can be perforated under the effect of the pressure of the fluid within the cartridge, a wall for injecting the fluid into the cartridge, and a nip region; and
    an extraction device configured to accept the cartridge and comprising an injection cage and a cartridge support, with the injection cage including fluid injection means, a base and a closure piston unit which is mounted so that it can move axially with respect to the base; and the cartridge support comprising perforating means for perforating the delivery wall of the cartridge under the effect of the pressure of the fluid in the cartridge, wherein the injection cage comprises an internal extraction cavity having a shape designed to at least partially accept the cartridge therein;
    wherein the injection cage and the cartridge support are arranged in such a way as to be movable relative to one another by a closure device which closes them around the cartridge prior to injection to trap the cartridge in the nip region, and the closure piston unit is movable relative to the base under the effect of pressure exerted by the fluid against the nip region of the cartridge in order to generate clamping forces that remain higher than separating forces exerted at the nip region and thereby prevent the injection cage and the cartridge support from opening up relative to one another as the system is pressurized; and
    wherein the cartridge is a separate component from the extraction device and is placed on the cartridge support for being enclosed by the closure device through the relative movement, with the cartridge including sealing means, made of deformable material, to which the clamping forces of the piston unit are applied.

2. The extraction system according to claim 1, wherein the cartridge sealing means is an elastomeric seal having a thickness of 0.8 mm or less.

3. The extraction system according to claim 2, wherein the cartridge sealing means is an elastomeric seal having a thickness ranging between about 0.2 and 0.6 mm.

4. The extraction system according to claim 1, wherein the piston unit comprises a nip surface having a width of 1 mm or less.

5. The extraction system according to claim 1, wherein the cavity comprises at least one fluid supply duct and at least one opening element.

6. The extraction system according to claim 1, wherein the injection cage includes a pressure chamber.

7. The extraction system according to claim 6, wherein the pressure chamber is at least partially occupied by elastic thrusting means.

8. The extraction system according to claim 1, wherein the piston unit comprises a nip surface that forms discontinuous pressure surface portions for pressing against the nip region of the cartridge.

9. An extraction system for preparing a beverage from a cartridge using a fluid injected under pressure into the cartridge, comprising:
a cartridge comprising a beverage delivery wall which can be perforated under the effect of the pressure of the fluid within the cartridge, a wall for injecting the fluid into the cartridge, and a nip region; and
an extraction device configured to accept the cartridge and comprising an injection cage and a cartridge support, with the injection cage including fluid injection means, a base and a closure piston unit which is mounted so that it can move axially with respect to the base, wherein the injection cage comprises an internal extraction cavity having a shape designed to at least partially accept the cartridge therein; and the cartridge support comprising perforating means for perforating the delivery wall of the cartridge under the effect of the pressure of the fluid in the cartridge;
wherein the injection cage and the cartridge support are arranged in such a way as to be movable relative to one another by a closure device which closes them around the cartridge prior to injection to trap the cartridge in the nip region, and the closure piston unit is movable relative to the base under the effect of pressure exerted by the fluid against the nip region of the cartridge in order to generate clamping forces that remain higher than separating forces exerted at the nip region and thereby prevent the injection cage and the cartridge support from opening up relative to one another as the system is pressurized; and wherein the nip surface of the piston unit forms discontinuous pressure surface portions for pressing against the nip region of the cartridge.

10. The extraction system according to claim 9, wherein the piston unit comprises a nip surface comprising open grooves extending radially and separating the discontinuous nip portions.

11. An extraction system for preparing a beverage from a cartridge using a fluid injected under pressure into the cartridge, comprising:
a cartridge comprising a beverage delivery wall which can be perforated under the effect of the pressure of the fluid within the cartridge, a wall for injecting the fluid into the cartridge, and a nip region;
an extraction device configured to accept the cartridge and comprising an injection cage and a cartridge support, with the injection cage including fluid injection means, a pressure chamber that includes a base, and a closure piston unit which is mounted so that it can move axially with respect to the base; and the cartridge support comprising perforating means for perforating the delivery wall of the cartridge under the effect of the pressure of the fluid in the cartridge, wherein the pressure chamber forms an extension of the extraction cavity and the fluid is supplied to the pressure chamber by a plurality of openings or channels positioned radially between the extraction cavity and the pressure chamber; and
an elastic thrusting means, wherein the pressure chamber at rest is entirely occupied by the elastic thrusting means;
wherein the injection cage and the cartridge support are arranged in such a way as to be movable relative to one another by a closure device which closes them around the cartridge prior to injection to trap the cartridge in the nip region, and the closure piston unit is movable relative to the base under the effect of pressure exerted by the fluid against the nip region of the cartridge in order to generate clamping forces that prevent the injection cage and the cartridge support from opening up relative to one another as the system is pressurized.

12. The extraction system according to claim 11, wherein the pressure chamber forms an annular extension of the extraction cavity.

13. The extraction system according to claim 11, wherein the pressure chamber communicates with the extraction cavity via at least one opening or channel.

14. The extraction system according to claim 11, wherein the pressure chamber extends upstream of the extraction cavity.

15. An extraction system for preparing a beverage from a cartridge using a fluid injected under pressure into the cartridge, comprising:
a cartridge comprising a beverage delivery wall which can be perforated under the effect of the pressure of the fluid within the cartridge, a wall for injecting the fluid into the cartridge, and a nip region;
an extraction device configured with an extraction cavity to accept the cartridge and comprising an injection cage and a cartridge support, with the injection cage including fluid injection means, a pressure chamber that includes a base, and a closure piston unit which is mounted so that it can move axially with respect to the base; and the cartridge support comprising perforating means for perforating the delivery wall of the cartridge under the effect of the pressure of the fluid in the cartridge; and
an elastic thrusting means comprising a block of elastomer or silicone delimiting a duct, wherein the pressure chamber at rest is entirely occupied by the elastic thrusting means;
wherein the injection cage comprises an internal extraction cavity having a shape designed to at least partially accept the cartridge therein, and wherein the injection cage and the cartridge support are arranged in such a way as to be movable relative to one another by a closure device which closes them around the cartridge prior to injection to trap the cartridge in the nip region, and the closure piston unit is movable relative to the base under the effect of pressure exerted by the fluid against the nip region of the cartridge in order to generate clamping forces that prevent the injection cage and the cartridge support from opening up relative to one another as the system is pressurized.

16. The extraction system according to claim 15, wherein the elastic thrusting means is in the pressure chamber, is incompressible and comprises a first surface on which the fluid pressure is exerted, which extends radially with respect to the duct, and a second, thrust, surface extending transversely in such a way as to exert axial thrust on the piston unit.

17. An extraction device intended to accept a separate cartridge and comprising:
an injection cage comprising fluid injection means and a cartridge support arranged in such a way as to be movable relative to one another in the mode of closure around the separate cartridge prior to injection by a closure device and to trap the cartridge in a nip region, wherein the injection cage comprises a pressure chamber, a base and a closure piston unit mounted such that it can move axially with respect to the base, with the closure piston unit comprising a lateral rim which fits into a groove formed in the base to form a rim/groove interface with the piston unit being movable relative to the base by pressure exerted by fluid in the nip region of the cartridge in order to generate clamping forces which remain higher than separating forces exerted at the nip region and thereby oppose the opening up of the injection cage and the cartridge support relative to one another during pressurizing, and wherein the pressure chamber is at least partially occupied by an incompressible elastic thrusting means to seal the chamber at the rim/groove interface.

18. The device according to claim 17, wherein the piston unit comprises a nip surface having radial grooves and a width smaller than 1 mm.

19. The device according to claim 17, wherein the piston unit comprises a nip surface that forms discontinuous pressure surface portions for pressing against the nip region of the cartridge.

20. The device according to claim 17, wherein the incompressible elastic thrusting means is made of a silicone or elastomeric material that absorbs forces and transmits the forces to the piston unit and is configured to reduce the volume otherwise occupied by the fluid in the pressure chamber.

* * * * *